United States Patent [19]
Lewis

[11] 3,765,055
[45] Oct. 16, 1973

[54] METHOD AND APPARATUS FOR KILLING POULTRY OR OTHER FOWL

[75] Inventor: Ernest E. Lewis, Flowery Branch, Ga.

[73] Assignee: Gainesville Machine Company, Inc., Gainesville, Ga.

[22] Filed: Mar. 3, 1971

[21] Appl. No.: 120,639

[52] U.S. Cl............................ 17/11, 17/12, 17/52
[51] Int. Cl............................................ A22c 21/00
[58] Field of Search........................... 17/11, 12, 52

[56] References Cited
UNITED STATES PATENTS
3,490,092  1/1970  Harrison .................................. 17/11
3,571,845  3/1971  Martin et al. ........................... 17/11
3,017,660  1/1962  Reeves.................................... 17/12

Primary Examiner—Lucie H. Laudenslager
Attorney—Newton, Hopkins & Ormsby

[57] ABSTRACT

A method and apparatus for killing chicken or other fowl suspended in a head lowermost position by making a cut or similar opening through the neck of the bird adjacent the base of the skull to sever the jugular vein. The apparatus includes a pair of spaced guide means detailed for guiding and orienting the head of the fowl to be killed along a predetermined path and to a predetermined location. The spaced guide means include rotary guiding and orienting members which are provided for advancing the neck of the fowl along the predetermined path and for moving the head to the predetermined location. The rotary guide members are provided with fluid dispensing means for lubrication to permit the neck of the fowl to be moved easily through the guide means. Rotary cutting means is detailed in location relative to the predetermined path and predetermined location to make the cut through the neck of the bird adjacent the base of the skull for severing the jugular vein leading from the brain as the bird is advanced along the predetermined path. The depth of the cut in the neck of the bird is detailed to sever the jugular vein without severing the spinal cord, gullet or windpipe and to allow the head to remain attached to the neck portion of the poultry.

8 Claims, 5 Drawing Figures

Patented Oct. 16, 1973 3,765,055
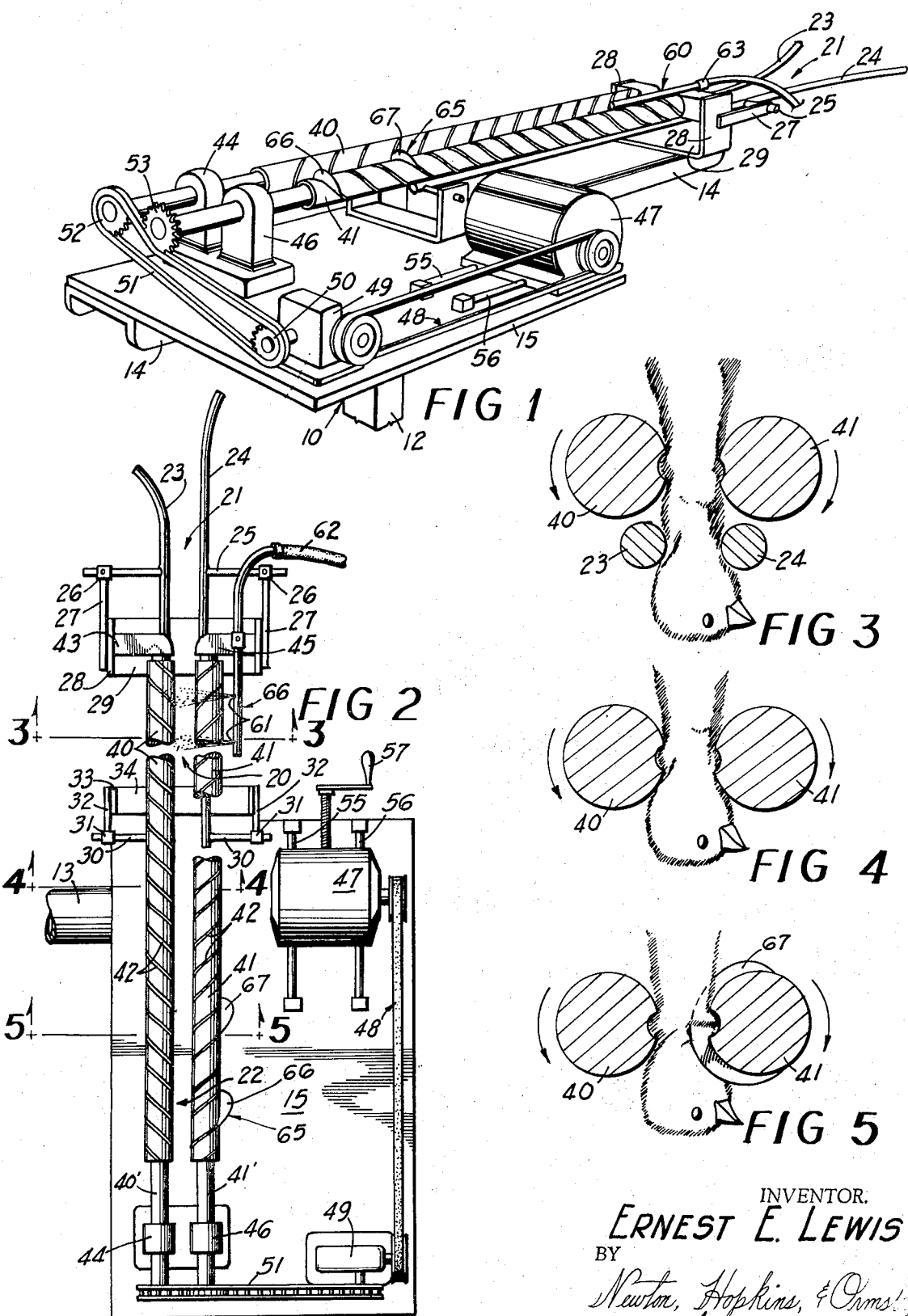
INVENTOR.
ERNEST E. LEWIS
BY
Newton, Hopkins, & Ormsby
ATTORNEYS

METHOD AND APPARATUS FOR KILLING
POULTRY OR OTHER FOWL

BACKGROUND OF THE INVENTION

In the processing of poultry and other fowl, the bird is usually suspended head down from a shackle which travels along on an overhead conveyor to those locations at which various processing operations are performed. Most of these processing operations are performed automatically by various poultry processing devices. However, the killing of the bird is still most often accomplished by hand because the automatic killing devices heretofore available have not been completely satisfactory. This is because, in the past, poultry, such as chickens and the like, have normally been killed by cutting the neck skin of the bird and the jugular vein in order that the heart continues to beat and pump the blood from the fowl to permit complete draining of the blood therefrom as it bleeds to death and because it is undesirable to also sever the spinal cord, windpipe or gullet of the bird at the time the jugular vein is severed.

Severing the spinal cord of the bird causes muscular spasms to occur which may result in bruising or breaking the wing or other parts of the birds; and, in addition, the severing of the spinal cord is undesirable because it stops the heartbeat of the bird. The continuing heartbeat obtained for a period of time when only the jugular vein of the bird is severed is highly desirable because it causes blood to be pumped from the bird's body rather than simply to flow from the body by gravity, which has been found to improve the quality of the meat.

If the windpipe is severed at the time that the jugular vein is severed, the continuing heartbeat of the bird which produces the highly desirable pumping of blood from the body of the bird will also cause continued breathing of the bird and the undesirable drawing of blood into the windpipe and lungs of the bird.

Thus, the killing of poultry as it moves along a processing line has commonly been accomplished by severing the jugular vein without, whenever possible, also severing the spinal cord or the windpipe. The automatic mechanical killing devices heretofore available have been unable to accomplish this processing operation in a completely satisfactory manner since, in many instances, they often cut the neck of the bird too deeply so that the neckbone itself is partially cut and the gullet, spinal cord and windpipe are also cut.

The method is carried out very well manually on low production lines when the processor has a good operator who is able to cut the jugular vein without cutting the windpipe or cutting into the neckbone itself. Most modern processing plants, however, have a very high production rate and, as a result of this production rate, the manual operator is so rushed that he too, often cuts deeply into the neck of the bird. Besides the aforementioned problems, two additional problems are created when the neck of the bird is cut too deeply. First, since the neck skin has been cut, the neck is usually contaminated when the chicken is passed through the scalding bath, and secondly, it has been found that the head of the chicken may be knocked off during the featherpicking operation which is conducted further down the processing line.

Thus, it is preferable that the killing of poultry as it moves along a processing line be accomplished without severing the spinal cord, gullet or windpipe.

SUMMARY OF THE INVENTION

Accordingly, it is the object of the present invention to provide a new and improved method of killing chickens and other fowl in a completely satisfactory and fully automatic manner as the bird passes along the processing line.

Another object of the present invention is to provide a novel method of killing chickens and other fowl without cutting the spinal cord, gullet or windpipe, but which still provides the proper bleedng thereof and prevents the occurrence of muscular spasms.

Still another object of this invention is to provide an improved apparatus for automatically killing chickens and other fowl which reduces the chances of contamination upon the subsequent removal of the windpipe and gullet.

A still further object of this invention is to provide an improved apparatus for cutting the jugular vein in the neck of a bird, but which will allow the head to remain attached to the neck and body of the bird.

Another object of this invention is to provide an improved apparatus for automatically killing chickens and other fowl in which rotatable guide means are provided for positioning the head of the bird relative to a predetermined location as it is advanced along a predetermined path.

A further oject of this invention is to provide means for lubricating the neck and head of the fowl during an advancing operation.

An additional object of this invention is to provide an improved apparatus for automatically killing chickens and other fowl which is simple in construction, economical to manufacture and reliable in operation.

The above stated objects of the present invention are obtained and the disadvantages of the prior art devices are overcome by the present invention which basically includes a pair of transversely spaced fixed guide members having a pair of rotatable advancing members located thereabove and including drive means for rotating the advancing members in opposite directions to effect an advancement of a bird along a predetermined path. A fluid supply means is operatively associated with the rotatable advancing members for introducing a quantity of lubricating liquid onto the advancing members to improve the advancing and orienting operation thereof. Severing means including rotatable cutting means is located adjacent the path of movement and is detailed in movement and location to be guided by the jawbone of the fowl to make a cut or similar opening in the neck of the bird beneath the jawborne and closely adjacent the base of the skull for severing the jugular vein leading from the brain. The rotatable cutting means is detailed in dimensions to limit the depth of cutting and for preventing the cutting of the spinal cord, gullet or windpipe, whereby the head will remain attached to the neck portions of the poultry.

These and other objects and advantages of the details of construction will become apparent upon reading the following description of one illustrative embodiment of the invention with reference to the accompanying drawings, in which like reference numerals have been used to designate like parts throughout the several figures, and wherein:

BRIEF DESCRIPTION OF THE FIGURES OF DRAWING

FIG. 1 is an overall perspective view of the improved killing apparatus, with a cover portion exploded therefrom for purpose of clarity.

25 2 is an enlarged fragmentary top plan view of the improved poultry killing apparatus, with certain parts being omitted for purpose of clarity;

FIG. 3 is a vertical sectional view taken substantially along line 3—3 of FIG. 2 illustrating the position of the head of a bird during an advancing operation;

FIG. 4 is a vertical sectional view similar to FIG. 3 taken substantially along line 4—4 of FIG. 2; and FIG. 5 is a vertical sectional view similar to FIGS. 3 and 4 and taken along line 5—5 of FIG. 2.

DESCRIPTION OF THE ILLUSTRATIVE EMBODIMENT

Referring now to the drawing, the improved fowl killing apparatus will be described with reference to a support framework 10, a head advancing and holding means 20 and cutting means 65.

The function of the support framework is to provide a means for supporting the advancing and holding means 20 and the cutting means 65 in a predetermined location relative to a poultry processing line having a conventional overhead conveyor means for conveying fowl in a head lowermost position past the poultry killing apparatus disclosed herein. As shown in FIGS. 1 and 2, the support framework 10 includes a vertical post 12 and a horizontally oriented channel shaped support member 14. A generally rectangular shaped mounting plate 15 is supported on member 14 for providing a support for the advancing and holding means 20 and the cutting means 65. The support framework utilized herein is constructed of conventional metal stock members with the joints secured together by conventional means, such as welding, not shown.

Referring now particularly to FIG. 2, the advancing and holding means 20 is oriented relative to the supporting framework to include an entrance end 21 and an exit end 22. The function of the advancing and holding means is to provide a means for engaging the neck portion of a bird conveyed therealong in a head lowermost position and to advance the neck and head of the bird along a predetermined path past the location of the cutting means 65 for making a cut in the neck of the bird beneath the jawbone and adjacent the base of the skull for severing the jugular vein leading therefrom.

The advancing and holding means includes a pair of transversely spaced guide rods 23, 24. Each of the guide rods 23, 24 includes a first stud shaft 25 extending laterally therefrom adjacent the entrance end. Stud shaft 25 is adjustably supported by a collar 26. The adjusting collar 26 includes a conventional locking screw means for allowing the stud shaft to be adjusted laterally relative to the collar 26 for varying the spacing between guide rods 23, 24. Collar 26 is fixed to a link 27 extending outwardly from a leg member 28 of a substantially U-shaped support bracket 29. The U-shaped support bracket 29 is mounted on an extended end of the channel-shaped horizontal support member 14, as shown in FIG. 1.

Each of the guide rods 23, 24 includes a second stud shaft 30 extending laterally outward therefrom adjacent the exit end, with stud shaft 30 adjustably supported by a collar element 31. Collar 31 is similar in design to the adjustable collar 26 and will cooperate therewith to allow the guide rods 23, 24 to be transversely spaced relative to each other. The adjustable support collar 31 is fixed to a link 32 extending from a leg 33 of a U-shaped support bracket 34. The means for supporting guide rod 24 is identical to the support means for guide rod 23 and the corresponding parts thereof have been designated with like reference numerals.

The above described relationship of the pair of guide rods 23, 24 is detailed such that the rods 23, 24 are supported in substantially horizontal relationship with a guide path located therebetween. The dimensions of the guide path can be varied by adjusting the stud support shafts 25, 30 within the adjustable support collars 26, 31, respectively.

As shown in FIGS. 1 and 2, a pair of advancing rollers 40, 41 are supported vertically above the two guide rods 23, 24. Each of the conveying rollers 40, 41 includes helical groove means 42 defined thereon for aiding in the advancement of the neck of the bird past the cutting means 65. The advancing roller 40 is supported adjacent the entrance end by a bearing block 43 which is fixed to upstanding leg 28 of the U-shaped bracket 29. Roller 40 is supported adjacent the exit end by a conventional bearing means 44 mounted on the upper surface of mounting plate 15. Conveying roller 41 is supported in substantially coplaner relationship and horizontally spaced relative to roller 40 by means of a bearing block 45 which is fixed to a second upstanding leg 28 of the U-shaped bracket 29 adjacent the entrance end thereof. Roller 41 is supported adjacent the exit end by means of a conventional bearing means 46 mounted on the upper surface of support plate 15. Rollers 40, 41 are provided with reduced surface portions 40', 41' adjacent the exit end to allow the head of the bird to be freed therefrom after the neck is cut.

As shown in FIGS. 1 and 2, the advancing rollers 40, 41 are driven by means of a conventional electric motor 47. Power from motor 47 is delivered by a conventional belt and pulley means 48 to a gear box 49. Drive from gear box 49 is effected through a sprocket 50 and chain 51 to a sprocket 52 which is fixed to a left extended end of roller 40, as shown in FIG. 1. The upper run of chain 51 passes beneath a sprocket 53 which is fixed to the left extended end of conveying roller 41. The above described driving relationship will rotate conveying roller 40 in a counterclockwise direction while the conveying roller 41 is driven in a clockwise direction when viewed from the discharge end and as indicated by the arrows in FIGS. 3-5. The helical groove means 42 of each of the conveying rollers 40, 41 are detailed in design such that the opposite directions of rotation of rollers 40, 41 will effect an advancement of the neck of the fowl along the path therebetween. The upward direction of motion of rollers 40, 41 adjacent the path of advancement will draw the head of the fowl upward, as shown in FIG. 4, to position it firmly against the surface of the rollers to hold the head in a predetermined position relative to cutting means 65, as shown in FIG. 5, for the cutting operation. Rollers 40, 41 will ensure that a maximum amount of neck skin remains attached to the body of the fowl.

As shown in FIG. 1, there is provided a gear box 49, chain and sprocket means 50, 51, etc., and support bearings 44, 46.

Drive motor 47 is mounted in a pair of guide track means 55, 56 for movably supporting motor 47 relative to support plate 15. Adjustment of the motor along the guide track means 55, 56 is effected by a conventional adjustable handle 57.

A fluid dispensing nozzle 60 is supported above advancing roller 41 adjacent the entrance end thereof. The fluid dispensing nozzle 60 is provided for dispensing a quantity of lubricating fluid onto the rollers 40, 41 during an advancing operation. Fluid dispensing nozzle 60 includes a plurality of openings 61 in which the fluid conveyed along supply line 62 is dispensed outwardly thereof. The fluid dispensing nozzle 60 is supported in a position above roller means 41 by a bracket 63 which is attached to the upper surface of the bearing block 45. The lubricating fluid dispensed by nozzle 60 could be water or other conventional lubricating material similar thereto.

As shown in FIGS. 1, 2 and 5, the improved poultry killing apparatus of the present invention is provided with rotary cutting means 65 detailed in location to be guided by the jawbone of the fowl to make a cut in the neck of the bird adjacent the base of the skull to sever the jugular vein.

The rotary cutting means 65 includes a pair of cutting elements 66, 67 which are fixed to advancing roller 41. The cutting elements 66, 67 are designed as lobes which extend an angular distance around the periphery of roller 41 and present outwardly directed cutting edges. The cutting lobes 66, 67 are detailed in dimensions to extend outwardly from the advancing roller 41 a sufficient amount to make a cut in the neck of the bird adjacent the base of the skull to sever the jugular vein without cutting the spinal cord, windpipe or gullet. Cutting lobes 66, 67 are aligned with the spiral groove means 42 on the advancing roller 41 and are located thereon in longitudinally spaced relationship adjacent the exit end 22 of the advancing roller means 40, 41. Cutting lobes 66, 67 are detailed in dimensions to extend only a portion of the angular distance around the surface of the advancing roller 41. Two cutting lobes 66, 67 are provided so that if one of the cutting lobes misses the neck of the bird during the rotary advancing movement, the second cutting lobe will ensure that a proper cut is made through the neck of the bird as indicated herein above.

An important feature of the present invention is that the surface of the rotary advancing roller 41 will serve as a limit for the depth of cut made in the neck of the bird adjacent the base of the skull whereby the spinal cord, gullet and windpipe will not be severed and the head of the bird will remain attached to the neck portion thereof. The depth of the cut in the neck of the bird will be only as deep as the distance cutting lobes 66, 67 project outwardly from the surface of rollers 40, 41. Further, the depth of the cut is detailed such that a maximum amount of blood will be drained through the severed jugular vein due to the pumping heartbeat of the bird, to effectively and satisfactory kill the bird by draining the blood through the cut in the neck without allowing blood to be sucked into the windpipe of the bird.

Conventional electrical control and circuit means (not shown) are provided for effecting operation of the electric motor 47.

OPERATION

Prior to an initiation of a killing operation, the improved killing apparatus must be placed below and oriented relative to a conveying line which includes a plurality of conventional supporting shackles which support the fowl in a head lowermost position.

In using the above described improved killing apparatus, the fowl being killed normally would have been stunned by some conventional means, such as electrical shock up the conveying line from the killing apparatus. As the stunned fowl are conveyed by the overhead conveying apparatus relative to the guide rods 23, 24 the height of the guide rods 23, 24 are detailed such that the head of the bird will pass into the space therebetween below the surface of the guide rods 23, 24. After the neck of the conveyed fowl enters the entrance end of the rotatable advancing rollers 40, 41 the neck of the fowl will be grasped by rollers 40, 41 in such a manner that the helical grooves will aid in advancing the neck of the fowl toward the exit end of the advancing and holding means and past the cutting means 65. The counterclockwise rotation of conveying roller 40 and clockwise rotation of conveying roller 41 will draw the neck of the fowl upwardly to locate the head of the fowl against the rollers 40, 41 and facing the rotary cutting elements 66, 67 whereby, guided by the jawbone of the fowl, a cut will be made in the neck of the bird adjacent the base of the skull thereby severing the jugular vein leading from the brain. The cut jugular vein will allow the bird to bleed freely until all blood is exhausted therefrom.

After the cut has been made, the head of the fowl will be allowed to pass through the reduced portion 40', 41' of the conveying rollers 40, 41 whereby the fowl can be conveyed to the next adjacent location for bleeding.

It now becomes apparent that the above described illustrative embodiment of the improved fowl killing apparatus is capable of obtaining the above stated objects and advantages. It is obvious that those skilled in the art may make modifications in the details of construction without departing from the spirit of the invention which is limited only by the scope of the appended claims.

What is claimed is:

1. An improved apparatus for killing poultry or other fowl comprising in combination: means for advancing the head of a bird along a predetermined path, said advancing means including means for moving the head of the bird in an angular direction relative to said predetermined path during said advancing operation for positioning said head at a predetermined location; and cutting means supported relative to said predetermined path and said predetermined location for making a cut in the neck of the bird adjacent the jawbone for severing the jugular vein leading from the brain in response to advancement along said predetermined path, the depth of said cut being detailed to prevent severing the windpipe and gullet of the bird, said advancing means including a pair of spaced driven roller means said roller means being provided with surface portions detailed for advancing the neck portion of the bird along said predetermined path and in said angular direction during a killing operation, said cutting means including at least one element fixed to one of said driven roller means whereby a cut will be made in the neck of the bird adjacent the base of the skull in response to advancement of said bird along said predetermined path and after said neck and head of said bird have reached said predetermined location.

2. In an improved apparatus for killing poultry or other fowl as described in claim 1 further characterized in that said cutting means includes at least one rotary cutting element, and wherein said rotary cutting element includes means for limiting the depth of said cut.

3. In an improved apparatus for killing poultry or other fowl as described in claim 1 further characterized in that said cutting means includes at least two rotary cutting elements and wherein said rotary cutting elements are longitudinally spaced relative to said predetermined path and detailed in position relative to said predetermined location for making said cut in the neck of said fowl adjacent the jawbone of the fowl.

4. In an improved apparatus for killing poultry or other fowl as described in claim 1 further characterized in that said apparatus includes dispensing means for dispensing lubricating material on said advancing means for lubricating said advancing means during said advancing operation.

5. In an apparatus for killing poultry or other fowl as described in claim 1 further characterized in that said advancing means includes a pair of spaced guide means with one of said guide means located on each side of said predetermined path and wherein said guide means are adjustable relative to each other to increase or decrease the space therebetween.

6. An improved apparatus for killing poultry or other fowl comprising in combination: means for advancing the head of a bird along a predetermined path, said advancing means including means for moving the head of the bird in an angular direction relative to said predetermined path during said advancing operation for positioning said head at a predetermined location; and cutting means supported relative to said predetermined path and said predetermined location for making a cut in the neck of the bird adjacent the jawbone for severing the jugular vein leading from the brain in response to advancement along said predetermined path, the depth of said cut being detailed to prevent severing the windpipe and gullet of the bird, said advancing means including a pair of spaced driven roller means, said roller means being provided with surface portions detailed for advancing the neck portion of the bird along said predetermined path and in said angular direction during a killing operation, said pair of spaced driven roller means being detailed in spacing and driving relation whereby the neck of said bird will be advanced in said angular direction relative to said predetermined path to position the head of said bird against a surface portion of said driven roller means, and a rotary cutting element being affixed to one of said rollers and detailed in location for making a cut in the neck of the bird adjacent the jawbone after the head of said bird has been positioned against a surface portion of said driven roller means.

7. In an improved apparatus for killing poultry or other fowl as described in claim 1 further characterized in that said pair of driven roller means includes at least two cutting elements longitudinally spaced along the length of one of said roller means and wherein said rotary cutting elements are angularly oriented relative to the longitudinal axis of said roller means and angularly oriented relative to a line drawn perpendicular to said longitudinal axis.

8. In an improved apparatus for killing poultry or other fowl as described in claim 7 further characterized in that said roller means includes helically arranged grooved surface portions for effecting said advancing operation and wherein said cutting elements are aligned with said helically arranged grooves.

* * * * *